G. C. MILLER.
SNAP FISH-HOOK.
No. 191,165. Patented May 22, 1877.
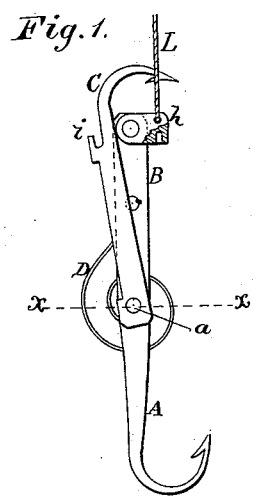
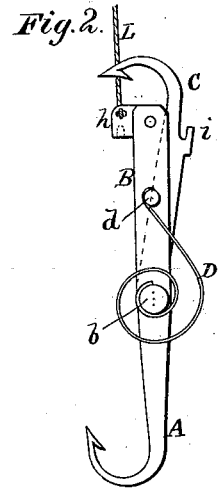
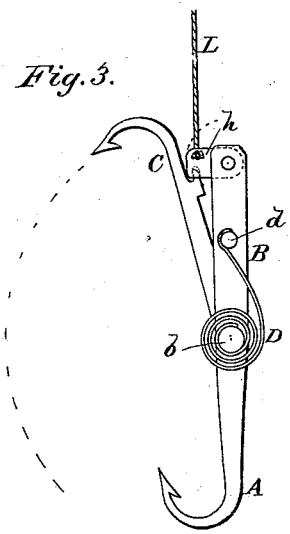
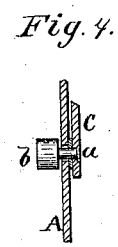
WITNESSES
INVENTOR
George C. Miller,
Henry N. Miller ATTORNEY

UNITED STATES PATENT OFFICE.

GEORGE C. MILLER, OF ALBEMARLE COUNTY, VIRGINIA.

IMPROVEMENT IN SNAP FISH-HOOKS.

Specification forming part of Letters Patent No. 191,165, dated May 22, 1877; application filed March 17, 1877.

*To all whom it may concern:*

Be it known that I, GEORGE C. MILLER, of Albemarle county, and State of Virginia, have invented certain new and useful Improvements in Fish-Hooks; and I do hereby declare that the following is a full, clear, and exact description thereof, which will enable others skilled in the art to which it appertains to make and use the same, reference being had to the accompanying drawing, and to the letters of reference marked thereon, which form a part of this specification.

The nature of my invention consists in the construction and arrangement of a spring fish-hook, having two hooks pivoted together, operated by a spring, and held "set" by a peculiar latch, all as hereinafter more fully set forth.

In the annexed drawing, which fully illustrates my invention, Figures 1 and 2 are side views of opposite sides of the fish-hook, showing the same sprung. Fig. 3 is a side view of the fish-hook, showing the same set. Fig. 4 is a cross-section through the line $x\ x$, Fig. 1.

A represents the main fish-hook, formed with a flat shank, B, of suitable dimensions. C represents the auxiliary or moving hook, pivoted to the side of the shank B at or near the center thereof, by means of a rivet, $a$, projecting from a head or stud, $b$. The rivet $a$ is passed loosely through the shank B, and the shank of the hook C fastened thereon, so that the rivet and stud will rotate with said hook C. On the stud $b$ is fastened one end of a spring, D, which is coiled around said stud, and the other end of the spring is fastened to a pin, $d$, projecting from the shank B, as shown. On the back of the hook C is formed an outwardly-projecting pin, $i$, which is to be caught by a latch, $h$, pivoted to the upper end of the shank B, and having the fishing-line L attached to it.

The hook C being turned on its pivot, so as to wind up the spring D, and be placed in the position shown in Fig. 3, the latch $h$ is placed over the pin $i$, thus setting the fish-hook and holding the hook C in such position.

The bait is to be placed, preferably, on the hook A. Now, when a fish takes hold of said hook A to swallow the bait, and strain consequently is put upon the line L, the latch $h$ is instantly released from the pin $i$, and the spring D forcibly swings the hook C around until the two hooks have a firm hold on the fish, so that it cannot work or slip off.

This fish-hook may be made of any size desired, and can be made strong and durable, and when so made is not liable to get out of order, and by the spring D being coiled around the stud $d$, and nothing in the way of the auxiliary hook C, the tension of said spring can be easily regulated by simply turning the auxiliary hook two, three, or more times around before fastening it with the latch $h$, and thus the force with which said hook C will strike may be gaged as circumstances may require.

I am fully aware that fish-hooks composed of one main hook and one auxiliary hook, operated by a spring, coiled or otherwise, are not new, and hence I do not claim such, broadly, as my invention; but in such cases where coiled springs have been used, the auxiliary hook could be turned around but once, and therefore the tension of said spring could not be regulated to gage the force of the auxiliary hook. With my invention this is accomplished, as the auxiliary hook can be turned around as many times as may be required to wind the coil-spring D until it acquires the desired tension.

Having thus fully described my invention, what I claim as new, and desire to secure by Letters Patent, is—

The combination, with the main hook A, provided with the shank B, having latch $h$ pivoted to its end, of the auxiliary hook C with projecting pin $i$, the pivot-pin $a$ with stud $b$, and the coiled spring D, all constructed and arranged as described, whereby the spring D may be wound up more or less by turning the auxiliary hook one or more times on its pivot, for the purposes set forth.

In testimony that I claim the foregoing as my own I affix my signature in presence of two witnesses.

GEORGE C. MILLER.

Witnesses:
REUBEN B. DICE,
LIZZIE C. MILLER.